US005405674A

United States Patent [19]

[11] Patent Number: 5,405,674

Wang et al.

[45] Date of Patent: Apr. 11, 1995

[54] RESILIENT FLOOR COVERING AND METHOD OF MAKING SAME

[75] Inventors: C. David Wang, Wilmington, Del.; John M. Eby, Pennsville, N.J.; David Lan, Arundel, Del.; Hao A. Chen, Glen Mills, Pa.; Richard E. Judd, Woodstown; Richard D. Joslin, Gibbstown, both of N.J.

[73] Assignee: Mannington Mills, Inc., Salem, N.J.

[21] Appl. No.: 170,851

[22] Filed: Dec. 21, 1993

Related U.S. Application Data

[62] Division of Ser. No. 758,621, Sep. 12, 1991.

[51] Int. Cl.$^6$ .................... B32B 9/00

[52] U.S. Cl. .................... 428/158; 428/95; 428/159; 428/161; 428/172; 428/195; 428/265; 428/267; 428/282; 428/424.6; 428/483; 428/908.8; 428/913

[58] Field of Search .................... 428/195, 913, 908.8, 428/483, 282, 159, 204, 203, 76, 483, 419, 424.6, 172, 95, 161, 265, 158

[56] References Cited

U.S. PATENT DOCUMENTS

| | | | |
|---|---|---|---|
| 3,870,591 | 3/1975 | Witman | 428/159 |
| 4,022,943 | 5/1977 | Erb et al. | 428/159 |
| 4,172,169 | 10/1979 | Mawson et al. | 428/159 |
| 4,333,987 | 6/1982 | Kwart et al. | 428/419 |
| 4,421,782 | 12/1983 | Bolgiano et al. | 427/53.1 |
| 4,781,987 | 11/1988 | Bolgiano et al. | 428/424.6 |

*Primary Examiner*—Patrick J. Ryan
*Assistant Examiner*—Abraham Bahta
*Attorney, Agent, or Firm*—Finnegan, Henderson, Farabow, Garrett & Dunner

[57] ABSTRACT

This invention is directed to a resilient, flexible surface covering that has a wear surface that meets the highest standards of stain, mar, scuff, and soil resistance and a method of making the same. The improved resilient surface covering comprises (a) a resilient support surface; and (b) a resilient wear surface adhered to the resilient support surface, the resilient wear surface comprising an underlying wear layer base coat and an overlying wear layer top coat adhered to the wear layer base coat, the wear layer base coat comprising a flexible, thermoset, polymeric composition having a flexibility such that the wear layer base coat passes a 1 inch mandrel diameter face out mandrel bend test when applied at a nominal dry film thickness of 1.0 mil over a flexible 80 mil underlying substrate, the wear layer top coat comprising, a hard, thermoset, UV-curable blend of acrylic or acrylate monomers, the wear layer top coat having a glass transition temperature of greater than 50° C. The present invention is also directed to separately or in combination with the improved wear surface, a resilient surface covering that has a strengthening layer that provides improved strength, toughness, resistance to breakage, especially resistance to tearing, and resistance to deformation, especially resistance to indentation and sliding gouging, and a method of making the same. The improved strengthening layer resilient surface covering comprises (a) a resilient support surface comprising an unfoamed strengthening layer comprising a vinyl resin and a polymerized, cross-linked monomer, with the proviso that, the strengthening layer is not disposed between two foam layers; and (b) a resilient wear surface adhered to the resilient support surface.

22 Claims, 2 Drawing Sheets

RESILIENT FLOOR COVERING AND METHOD OF MAKING SAME

This is a division of application Ser. No. 07/758/621, filed Sep. 12, 1991.

BACKGROUND OF THE INVENTION

1. Field of the Invention

The present invention relates generally to resilient surface coverings and, more particularly, to a resilient floor covering having a wear surface which provides improved stain, mar, scuff, and soil resistance and to a method for making the same. The present invention additionally relates to a resilient floor covering having an improved strengthening layer and to a method for making the same.

2. Description of Related Art

Resilient surface coverings, and in particular resilient floor coverings, are well known in the art. In the manufacture of resilient floor coverings, normally, a relatively flat base layer or substrate is laid out in substantially horizontal condition. Such a base layer or substrate is usually a felted or matted fibrous sheet of overlapping, intertwined filaments and/or fibers, usually of asbestos or of natural, synthetic or man-made cellulosic origin, such as cotton or rayon, although many other forms of sheets, films, textile materials, fabrics or the like, may be used.

Upon this substantially flat, horizontally positioned base layer or substrate is then deposited or applied a substantially uniform layer of a liquid or semi-liquid resinous composition which contains a synthetic polymeric material, usually an ungelled polyvinyl chloride plastisol and normally containing a blowing or foaming agent. This liquid or semi-liquid plastisol vinyl resin composition is subsequently firmed or gelled at an elevated temperature to a relatively more stable condition by procedures which are conventional and well-known in the art. This relatively firm, gelled plastisol may then be printed with a decorative, multicolored pattern or design in which certain predetermined areas may contain a blowing or foaming inhibitor which subsequently modifies or alters the action of the blowing or foaming agent in those certain predetermined areas. Several different printing ink compositions may be used in such procedures.

Typically, a wear layer is then applied to the surface of the polyvinyl chloride plastisol. Generally, the wear layer consists of either a plasticized polyvinyl chloride composition and/or a urethane or urethane acrylate composition. Examples of such wear layers can be found in, for example, U.S. Pat. No. 4,333,987 to Kwart et al., U.S. Pat. No. 4,180,615 to Bettoli, U.S. Pat. No. 4,393,187 to Boba et al., and U.S. Pat. No. 4,507,188 to Chu.

An optimum resilient floor covering should be stain, mar, scuff, and soil resistant but must also be flexible. Those in the art have had to sacrifice some of these properties in achieving one or more of stain, mar, scuff or soil resistance or flexibility.

The term "mar resistance" refers to the ability of the wear surface to resist scratching, which results in a loss of gloss due to abrasive wear. Good mar resistance results in good gloss retention.

"Stain resistance" generally refers to the ability of the wear surface to resist stains from foods, chemicals, etc., that a flooring wear surface may be subjected to through normal household use.

The term "scuff resistance" is the ability of the wear surface to resist plastic flow when subjected to the force and frictional heat caused by the dragging of, for example, rubber or plastic soled shoes.

"Soil resistance" is the ability of the wear surface to resist becoming discolored through staining, scratching, scuffing or other degradation mechanisms.

Hard wear surfaces generally are very stain resistant. But because it is desired to achieve a resilient flooring product that is flexible, the wear surface must be flexible enough to meet product requirements during manufacture, transportation, installation and final use. Wear surfaces which exhibit the best stain resistant properties are too hard, and cannot meet the flexibility requirements of a resilient flooring product, especially when applied at dry film thickness (DFT) greater than 1 mil. Wear surfaces for coated PVC resilient floor coverings are typically greater than about 1 mil. Flexible wear surfaces generally have better mar resistance than hard wear surfaces but do not have as good stain resistance as hard wear surfaces.

Because hard coatings could not be used due to the flexibility requirement, the wear surface was made "tougher" and more "elastic" to achieve good mar resistance. Unfortunately, these "elastic" formulations exhibit marginal stain resistance.

Thermoplastic wear surfaces, such as plasticized non-cross-linked polyvinyl chloride wear surfaces, have better stain resistance than most thermoset urethanes but do not have the ability of thermoset wear surfaces, such as chemically cross-linked urethane or urethane acrylate wear surfaces, to resist marring, scuffing and/or soiling resistance.

In recent years the art has tried to bridge the gap between mar and stain resistance. Because neither plasticized polyvinyl chloride wear surfaces nor urethane or urethane-acrylate wear surfaces have been found to possess all of the desired resistance properties, considerable effort has been expended to develop new and different types of wear layers. Some participants in the resilient flooring industry have attempted to circumvent the problems of hard polyurethane coatings by using coatings made from other polymers.

In U.S. Pat. No. 4,781,987 to Bolgiano et al., there is disclosed a resilient floor covering that is alleged to have improved scratch and stain resistance. The resilient floor covering includes a resilient support surface and a resilient wear surface bonded to the support surface, the wear surface comprising a top first layer material and a cross-linked underlying second layer material selected from the group consisting of a moisture cured polyurethane, a moisture and UV-cured polyurethane, a UV-cured polyurethane and a cured unsaturated polyester adhered to the support surface, the first layer material being obtained from the thermal curing of a composition comprising a polyol component, an aminoplast component, and an acid catalyst component, wherein the first layer material conforms to physical deformations of the cross-linked second layer material and having improved scratch and stain resistance properties relative to the cross-linked second layer material. One commercially-practiced example corresponding to this disclosure uses an aminoplast of a type similar to that which is customarily used as a component of the protective barrier coating on the inside surfaces of food and beverage cans.

However, the aminoplast resin coating of Bolgiano et al. '987 suffers from several deficiencies. The gloss level is typically lower than that of polyurethane coatings, gloss retention is typically poorer than polyurethane coatings and, in some applications, the aminoplast coating may be removed by a scuffing type impact. Moreover, the Bolgiano et al. coatings require the expenditure of additional energy to evaporate the water or organic solvent. Thus, the only advantage of the aminoplast resin coating is for providing stain resistance.

Tough and rubbery polyurethane coatings have excellent gloss retention but have relatively poor stain resistance. Hard polyurethane coatings have excellent or at least very good resistance to staining.

These same hard polyurethane coatings are relatively brittle and tend to crack when applied over a flexible vinyl floor covering at any thickness approaching the usual and customary thickness for polyurethane coatings on this substrate. The brittleness problem with these hard polyurethane coatings can be circumvented by very thin application, such as 10% of the usual and customary dry film thickness. Although the very thin dry film thickness of a hard polyurethane coating on a flexible vinyl floor covering has a very good adhesion as measured by tests such as a crosshatch adhesion, the thin coating can be removed from the vinyl substrate by a scuffing type of impact.

Applicants have unexpectedly discovered that the disadvantages of the tough and rubbery coatings and the hard polyurethane coatings can be overcome by utilizing a two layered wear layer of the instant invention. The resulting coated resilient flooring product is stain, mar, scuff, and soil resistant and flexible and retains the typical polyurethane high gloss level.

The prior art has additionally searched for a strengthening layer utilized underneath of the foamed layer that adds toughness to a resilient floor covering. A strengthening layer for a resilient floor covering should have the advantageous properties of cut, tear and deformation resistance during installation and resistance to indentation and gouging during use. Generally, prior art strengthening layers of fibrous sheets or resin impregnated fibrous sheets are used. However, the prior art strengthening layers typically suffer from the disadvantages of deformation and tearing during installation and/or poor indentation resistance during use.

U.S. Pat. No. 3,870,591 to Witman discloses an intermediate, fluid-applied, cross-linked, reinforcing layer which is flexible and resistant to stretching and which stabilizes the floor covering during use. This strengthening layer is disposed between two foam layers.

Applicants have unexpectedly discovered that this intermediate layer can be advantageously utilized underneath the foam layer or underneath all of the foam layers if more than one foam layer is present to strengthen a resilient floor covering. Moreover, the cross-linked strengthening layer has improved strength, toughness, resistance to breakage, especially resistance to tearing, and resistance to deformation, especially resistance to indentation and sliding gouging, when compared to a conventional, vinyl backed layer.

SUMMARY OF THE INVENTION

To achieve the object of providing a resilient floor covering that meets the highest resistance standards for staining, marring, soiling and scuffing, a resilient surface covering is provided, said resilient surface covering comprising:

(a) a resilient support surface; and (b) a resilient wear surface adhered to said resilient support surface, said resilient wear surface comprising an underlying wear layer base coat and an overlying wear layer top coat adhered to said wear layer base coat, said wear layer base coat comprising a flexible, thermoset, polymeric composition having a flexibility, such that the wear layer base coat passes a 1 inch mandrel diameter face out mandrel bend test when applied at a nominal dry film thickness of 1.0 mil over a flexible 80 mil underlying substrate, said wear layer top coat comprising, a hard, thermoset, UV-curable blend of acrylic or acrylate monomers, said wear layer top coat having a glass transition temperature of greater than 50° C.

The uniqueness of the subject wear surface rests with the combined properties it exhibits for flexibility and stain, mar, scuff, and soil resistance. The wear coatings of this invention exhibit a flexibility needed for a resilient floor covering, excellent stain resistance, a high gloss, excellent mar resistance properties which lead to relatively low maintenance, excellent scuff resistance, excellent soil resistance, and the advantage that certain types of normally porous inlaid vinyl floor coverings can be sealed on the surface with the subject wear coatings to eliminate the need for protective wax coatings intended to seal surface porosity.

Additionally, as a separate embodiment from the wear surface of this invention or in combination with the wear surface of this invention, to achieve a surface covering that has superior strength, toughness, resistance to breakage, especially resistance to tearing, and resistance to deformation, especially resistance to indentation and sliding gouging, a resilient surface covering is provided comprising:

(a) a resilient support surface comprising an unfoamed strengthening layer comprising a vinyl resin and a polymerized, cross-linked monomer, with the proviso that, said strengthening layer is not disposed between two foam layers; and (b) a resilient wear surface adhered to said resilient support surface.

The proviso that the strengthening layer of this invention is not disposed between two foam layers can also be stated that a foamed layer is not utilized between the strengthening layer and the bottom surface of the covering. The bottom surface is that part of the covering adjacent to the floor or adjacent to the surface being covered.

The improved wear surface of this invention can be used in combination with the improved strengthening layer of this invention. Accordingly, a resilient surface covering is provided, said resilient surface covering comprising:

(a) a resilient support surface comprising an unfoamed strengthening layer comprising a vinyl resin and a polymerized, cross-linked monomer, with the proviso that, said strengthening layer is not disposed between two foam layers; and (b) a resilient wear surface adhered to said resilient support surface, said resilient wear surface comprising an underlying wear layer base coat and an overlying wear layer top coat adhered to said wear layer base coat, said wear layer base coat comprising a flexible, thermoset, polymeric composition having a flexibility, such that the wear layer base coat passes a 1 inch mandrel diameter face out mandrel bend test when applied at a nominal dry film thickness of 1.0 mil over a flexible 80 mil underlying substrate, said wear layer top coat comprising, a hard, thermoset, UV-curable blend of acrylic or acrylate monomers, said wear layer top coat having a glass transition temperature of greater than 50° C.

To achieve the foregoing objects and in accordance with the purpose of the invention, as embodied and broadly described herein, a method of making a resilient floor covering that meets the highest standards of staining, marring, scuffing and soiling resistance and which meets the necessary flexibility is provided.

One method of the present invention is directed to providing a resilient floor covering comprising the steps of:

(a) providing a resilient support surface;

(b) applying to the top of and adhering to said resilient support surface, a wear surface, (b1) said wear surface being applied by applying a wear layer base coat comprising a flexible, thermoset, polymeric composition having a flexibility, such that the wear layer base coat passes a 1 inch mandrel diameter face out mandrel bend test when applied at a nominal dry film thickness of 1.0 mil over a flexible 80 mil underlying substrate;

(b2) curing said wear layer base coat;

(b3) applying to the top of and adhered to said wear layer base coat, a wear layer top coat comprising, a hard, thermoset, UV-curable blend of acrylic or acrylate monomers, said wear layer top coat having a glass transition temperature of greater than 50° C.; and (b4) curing said wear layer top coat.

Additionally, a further method of the present invention is directed to providing a resilient floor covering comprising the steps of:

(a) providing a resilient support surface;

(b) applying to the top of and adhering to said resilient support surface, a wear surface, (b1) said wear surface being applied by applying a wear layer base coat comprising a flexible, thermoset, polymeric composition having a flexibility, such that the wear layer base coat passes a 1 inch mandrel diameter face out mandrel bend test when applied at a nominal dry film thickness 0f 1.0 mil over a flexible 80 mil underlying substrate;

(b2) partially curing said wear layer base coat;

(b3) applying to the top of said wear layer base coat, a wear layer top coat comprising a hard, thermoset, UV-curable blend of acrylic or acrylate monomers, said wear layer top coat having a glass transition temperature of greater than 50° C.; and (b4) completely curing said wear layer base coat and said wear layer top coat.

Another method of the present invention is directed to providing a resilient surface covering having an improved strengthening layer comprising the steps of:

(a) providing a resilient support surface comprising curing an unfoamed strengthening layer comprising a vinyl resin and a polymerized, cross-linked monomer, with the proviso that, said strengthening layer is not disposed between two foam layers; and (b) providing a resilient wear surface adhered to said resilient support surface.

Additionally, there is provided a method of making a resilient surface covering having both an improved wear layer and an improved strengthening layer comprising the steps of:

(a) providing a resilient support surface comprising curing an unfoamed strengthening layer comprising a vinyl resin and a polymerized, cross-linked monomer, with the proviso that, said strengthening layer is not disposed between two foam layers; and (b) applying to the top of and adhering to said resilient support surface, a wear surface, (b2) said wear surface being applied by applying a wear layer base coat comprising a flexible, thermoset, polymeric composition having a flexibility, such that the wear layer base coat passes a 1 inch mandrel diameter face out mandrel bend test when applied at a nominal dry film thickness of 1.0 mil over a flexible 80 mil underlying substrate;

(b2) curing said wear layer base coat;

(b3) applying to the top of and adhered to said wear layer base coat, a wear layer top coat comprising a hard, thermoset, UV-curable blend of acrylic or acrylate monomers, said wear layer top coat having a glass transition temperature of greater than 50° C.; and (b4) curing said wear layer top coat.

There is also provided an additional method of making a resilient surface covering having both an improved wear layer and an improved strengthening layer comprising the steps of:

(a) providing a resilient support surface comprising curing an unfoamed strengthening layer comprising a vinyl resin and a polymerized, cross-linked monomer, with the proviso that, said strengthening layer is not disposed between two foam layers; and (b) applying to the top of and adhering to said resilient support surface, a wear surface, (b2) said wear surface being applied by applying a wear layer base coat comprising a flexible, thermoset, polymeric composition having a flexibility, such that the wear layer base coat passes a 1 inch mandrel diameter face out mandrel bend test when applied at a nominal dry film thickness of 1.0 mil over a flexible 80 mil underlying substrate;

(b2) partially curing said wear layer base coat material;

(b3) applying to the top of said base coat wear layer material, a wear layer top coat material comprising a hard, thermoset, UV-curable blend of acrylic or acrylate monomers, said wear layer top coat having a glass transition temperature of greater than 50° C.; and (b4) completely curing said wear layer base coat material and said wear layer top coat material.

Additional objects, features and advantages of the present invention will be set forth in part in the description which follows and, in part, will be obvious from the description or may be learned by practice of the invention. The objects, features and advantages of the invention may be realized and attained by means of the instrumentalities and combinations particularly pointed out in the appended claims.

The accompanying figures, which are hereby incorporated in and constitute a part of this specification, illustrate the preferred embodiments of the invention and, together with the description, serve to explain the principles of the invention.

Figure 1:
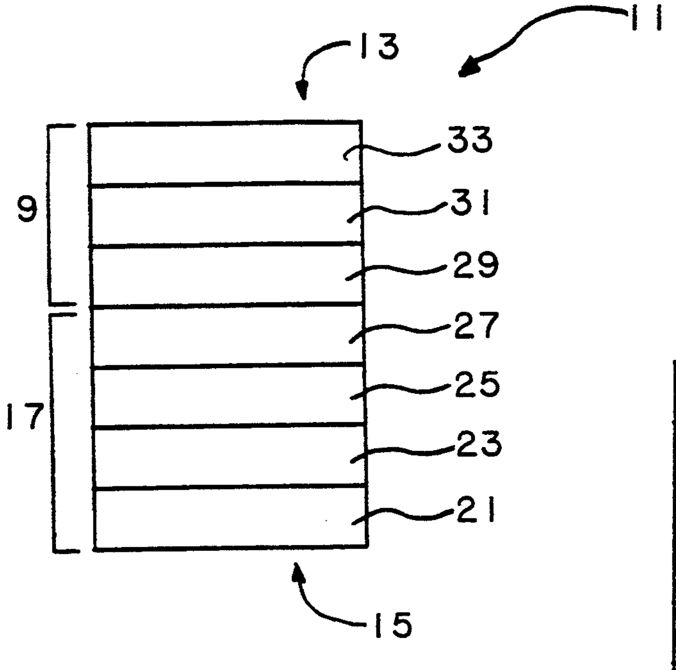
FIGS. 1–8 show cross-sectional views of resilient floor coverings constructed according to the teachings of various embodiments of the present invention.

It will be appreciated that where a particular layer from FIG. 1 is repeated in subsequent figures, the repeated layer shown in the subsequent figures will retain the same corresponding number as that of FIG. 1. It will also be appreciated that in the figures, the dimensions of the various features, including the relative dimensions of one feature to another, are not to scale.

DETAILED DESCRIPTION OF THE PREFERRED EMBODIMENTS

The present invention is directed to an improved wear surface or an improved strengthening layer or the combination thereof. The improved wear surface of this invention, the improved strengthening layer of this invention or the combination thereof of this invention can be utilized with a flexible surface covering or sheet that is capable of being rolled up. Additionally, it should be understood that the wear surface, the strengthening layer or the combination thereof of this invention can be flexible, yet each can be used with a surface covering that is rigid or stiff, such as tile.

The present invention is directed to a resilient floor covering which includes a wear surface that meets the highest standards of stain, mar, scuff and soil resistance yet is still flexible. The inventors discovered that they could obtain superior results by providing a wear surface comprising two different coatings.

Not wishing to be bound by theory, it is believed that (1) the wear surface of this invention achieves excellent scuff resistance by providing that both the wear layer base coat and the wear layer top coat be thermoset due to sufficient cross-linking and (2) the wear surface of this invention achieves excellent stain and mar resistance by providing a wear layer top coat of a hard, thermoset UV-curable blend of acrylic or acrylate monomers, the wear layer top coat having a glass transition temperature of greater than 50° C. and a wear layer base coat adhered to the wear layer top coat of a flexible, thermoset, polymeric composition having a flexibility such that the wear layer base coat passes a 1 inch mandrel diameter face out mandrel bend test when applied at a nominal dry film thickness of 1.0 mil over a flexible 80 mil underlying substrate.

The present invention is also directed to a resilient floor covering which includes a strengthening layer that meets the highest standards of strength, toughness, resistance to breakage, especially resistance to tearing, and resistance to deformation, especially resistance to indentation and sliding gouging. The strengthening layer comprises a non-foamable layer disclosed in U.S. Pat. No. 3,870,591 to Witman as a layer intermediate between two foam layers. U.S. Pat. No. 3,870,591 is hereby incorporated by reference for all of its teachings and is specifically incorporated by reference for the teachings of, among other things, the composition of the strengthening layer and the method of making the strengthening layer. Such a strengthening layer of this invention generally comprises a vinyl resin and a polymerized cross-linked monomer.

As used in the current invention, the strengthening layer generally comprises a vinyl resin and a polymerized cross-linked monomer. The strengthening layer does not contain a blowing or foaming agent and is not blown or foamed.

As stated above, the components of the strengthening layer as taught by U.S. Pat. No. 3,870,591 are incorporated by reference. The most preferred vinyl resin in the strengthening layer is a poly(vinyl chloride) homopolymer. Copolymers of vinyl chloride with minor amounts of other monomers, such as vinyl acetate, other vinyl esters and/or vinylidene chloride, may also be used.

The preferred polymerizable cross-linking monomers in the strengthening layer are the mono-, di-, tri- and tetrafunctional acrylates and methacrylates and blends thereof prepared by the esterification of the appropriate alcohols with acrylic or methacrylic acid. The most preferred polymerizerable cross-linking monomer is trimethylolpropane trimethacrylate. Other preferred monomers are trimethylolpropane triacrylate, pentaerythritol tetraacrylate, and pentaerythritol tetramethacrylate. Monofunctional and/or difunctional acrylates and methacrylates, such as 2-ethylhexyl acrylate, lauryl methacrylate, hexanediol diacrylate and diethylene glycol dimethacrylate, may be blended with the tri- and/or tetra-functional cross-linking monomer to reduce cross-link density.

The preferred free radical catalyst used to initiate polymerization of the cross-linking monomer in the strengthening layer is an organic peroxide. The most preferred catalyst is di-t-butyl peroxide. Other preferred catalysts include other dialkyl peroxides, diacyl peroxides such as benzoyl peroxide, peroxyesters such as t-butyl perbenzoate, peroxydicarbonates such as di-2-ethylhexyl peroxydicarbonate, and hydroperoxides such as t-butyl hydroperoxide. The selection of the reactive monomer and polymerization catalyst will dictate the amount of cross-link density of the strengthening layer.

Other additives disclosed in U.S. Pat. 3,870,591 to Witman, such as plasticizers, stabilizers, pigments, dyes, fillers or other decorative elements may be added to the composition to be formed into the strengthening layer.

The thickness of the strengthening layer is preferably from 5 to 75 mils and more preferably from 35 to 40 mils.

The wear layer base coat generally comprises a flexible, thermoset, polymeric composition having a flexibility such that the wear layer base coat passes a 1 inch mandrel diameter face out mandrel bend test when applied at a nominal dry film thickness of 1.0 mil over a flexible 80 mil underlying substrate.

The flexibility of the wear layer base coat is preferably such that the wear layer base coat passes a 0.5 inch, and more preferably a 0.25 inch, mandrel diameter face out mandrel bend test when applied at a nominal dry film thickness of 1.0 mil over a flexible 80 mil underlying substrate. The thickness of the wear layer base coat, once cured, is preferably from 0.7 mils to 3.0 mils and more preferably from 0.9 mils to 1.2 mils.

The wear layer top coat generally comprises a hard, thermoset, UV-curable blend of acrylic or acrylate monomers having a glass transition temperature (Tg) of greater than 50° C.

The cured blend of acrylic or acrylate monomers of the wear layer top coat has a glass transition temperature of greater than 50° C., preferably at least 67° C. The thickness of the wear layer top coat, once cured, is preferably from 0.1 mils to 0.5 mils, more preferably from 0.2 mils to 0.3 mils. The wear layer top coat must not be too thin or a poor stain resistance results, but it must not be too thick or cracking may result.

To achieve excellent scuff resistance, the combined wear layer base coat plus wear layer top coat dry film thickness is preferably at least 0.8 mils. The dry film thickness (DFT) is the thickness after curing. The cured thickness of a layer can be less than the uncured thickness due to, for example, solvent removal. Additionally, to achieve excellent scuff resistance, both the wear layer base coat and the wear layer top coat are thermoset. The wear layer base coat and the wear layer top coat thermoset characteristics are due to sufficient cross-linking within each of the respective wear layer base coat and wear layer top coat polymeric networks. Preferably, within each wear layer, the wear layer base coat and the wear layer top coat are each cross-linked sufficiently to be insoluble in methyl ethyl ketone, isopropyl alcohol and tetrahydrofuran.

The wear layer base coat can be, for example, a water based, solvent based, UV-curable or non-UV curable system. For example, the wear layer base coat can be comprised of acrylics, acrylates, urethanes, epoxies, other type vinyls, other type polymers, and blends thereof, as long as the composition when cured, results in a flexible, thermoset coating with adequate cross-link density.

Preferred acrylic or urethane-acrylate monomer blends for use in making the wear layer base coat are as follows: PHOTOGLAZE® U248, PHOTOGLAZE® U233, and PHOTOGLAZE® U206, all sold by the Lord Corporation of Erie, Pa., USA and VALRAD® KKC0047, sold by The Valspar Corporation of Minneapolis, Minn., USA.

The most preferred composition for the wear layer base coat is PHOTOGLAZE® U233.

Preferred acrylic or acrylate monomer blends for use in making the wear layer top coat are as follows: PHOTOGLAZE® U249 and PHOTOGLAZE® IC5050-55, both sold by the Lord Corporation of Erie, Pa., USA and VALRAD® KKC0044, sold by The Valspar Corporation of Minneapolis, Minn., USA.

The most preferred composition for the wear layer top coat is PHOTOGLAZE® U249.

The PHOTOGLAZE® resins comprise blends of cross-linkable UV-curable acrylic monomers. VALRAD® KKC0047 comprises a cross-linkable UV-curable blend of approximately 20 wt. % of isobornyl acrylate, approximately 25 wt. % of an acrylate ester monomer, specifically 2-propenoic acid, (1-methyl-1,2-ethanediyl)bis(oxy(methyl-2,1-ethanediyl) ester and approximately 55 wt. % of a urethane acrylate oligomer. VALRAD® KKC0044 comprises a cross-linkable UV-curable blend of approximately 20 wt. % of isobornyl acrylate, approximately 30 wt. % of an acrylate monomer, specifically 2-propenoic acid, 2-ethyl-2-(((1-oxo-2-propenyl)oxy)methyl)-1,3-propanediyl ester, approximately 30 wt. % of an acrylate ester monomer, specifically 2-propenoic acid, (1-methyl-1,2-ethanediyl)bis(oxy(methyl-2,1-ethanediyl)) ester, and approximately 15 wt. % of an acrylate oligomer.

Referring now to FIG. 1, there is illustrated in cross-section a resilient floor covering which is constructed according to the teachings of one embodiment of the present invention and which is designated generally by reference numeral 11.

Covering 11 has a top surface 13 and a bottom surface 15. Covering 11 includes a resilient support surface 17 and a resilient wear surface 19.

The support surface 17, which is preferably laid out in substantially horizontal condition, is preferably a conventional substrate layer 21, a non-foam strengthening layer 23, which is disclosed as a layer intermediate between two foam layers in U.S. Pat. No. 3,870,591 to Witman, a foam layer 25 and a design layer 27.

Layer 21 is an optional substrate layer. It is useful as a controlled release layer after the structure 11 is stripped from a release paper layer in the manufacture of the floor covering of FIG. 1 and is also useful to provide improved adhesion in the final product installation.

Layer 21 is a conventional substrate layer known to those in the art. Conventional substrate layer 21 comprises materials typical of substrate layers found in the flooring art, such as non foamed, non cross-linked, vinyl compositions, felted or matted fibrous sheet of overlapping, intertwined filaments and/or fibers, usually of asbestos or of natural, synthetic or man-made cellulosic origin, such as cotton or rayon, although many other forms of sheets and films or textile materials, fabrics or the like, may be used. It preferably comprises a polymerized non-cross-linked PVC composition. The thickness of conventional substrate layer 21 is preferably from 2 to 100 mils, more preferably from 5 to 15 mils.

Strengthening layer 23 is either disposed on top of and adhered to substrate layer 21 or is the outermost bottom layer when substrate layer 21 is not used.

Disposed on top of and adhered to strengthening layer 23 is a substantially uniform layer 25 of a liquid or semi-liquid resinous composition which contains a synthetic polymeric material, usually an ungelled poly(vinyl chloride) plastisol and normally containing a blowing or foaming agent. The liquid or semi-liquid plastisol vinyl resin composition of layer 25 is subsequently firmed or gelled at an elevated temperature to a relatively more stable condition by procedures which are conventional and well-known in the art. The thickness of foam layer 25 is preferably from 10 to 100 mils, more preferably from 15 to 40 mils.

Layer 27 is a design layer printed on layer 25. Layer 27 is an optional layer and is not included if a design is not desired. The design layer can preferably be a decorative, multicolored pattern or design in which certain predetermined areas may contain a blowing or foaming inhibitor which subsequently modifies or alters the action of the blowing or foaming agent in those certain predetermined areas. Several different printing ink compositions may be used in such procedures. The design layer can preferably be a gravure printed layer.

The design layer 27 is not necessarily a continuous layer. The design may only cover a portion of the underlying layer 25. In locations where there is no design layer, the wear surface 19 will therefore be adhered to foam layer 25.

Wear surface 19, which, as seen in the drawing is applied to the top of and adhered to layer 27, comprises an initial wear layer 29, a wear layer base coat 31 and a wear layer top coat 33. Initial wear layer 29 is preferably a transparent poly(vinyl chloride) layer. Most PVC wear layers that are known in the art to be formulated for use on PVC resilient flooring products would provide an adequate composition for this layer. The dry film thickness of this PVC layer 29 is preferably from 5 mils to 50 mils and more preferably from 10 mils to 20 mils.

The initial wear layer is an optional layer. The initial wear layer is preferably used when a foam layer is present to provide adhesion between the foam layer and the wear layer base coat, to provide smoothing of the upper surface of the blown foam layer and to control any chemical embossing. If an initial wear layer is not used, the wear layer base coat 31 should be adequately adhered to the underlying layer.

A wear layer base coat 31 is applied to and adhered to initial wear layer 29 and is then cured or partially cured. The wear layer base coat can be cured by means known to those skilled in the art, such as by ultraviolet light or thermal treatments.

Wear layer top coat 33 is applied to the top of and adhered to the wear layer base coat 31 and is UV-cured or both layers 31 and 33 are cured by their respective curing methods if wear layer base coat 31 was only initially partially cured.

In separate embodiments of this invention, both wear layers 31 and 33 can be absent or wear layer base coat 31 can be present and wear layer top coat 33 can be absent if the superior strengthening layer 23 of this invention is present. In another embodiment, the superior strengthening layer 23 of this invention can be absent and a conventional substrate layer can be used in its place if both the wear layer base coat 31 and wear layer top coat 33 of this invention are used.

To insure that the flooring composite exhibits the desired performance properties for its intended end use, each layer of the composite must exhibit adequate adhesion to the layer below and above it. The layers are generally adhered together by coating and curing each subsequent layer and/or by using an adhesive or bonding agent between layers to increase the adhesion. The initial wear layer 29 should adhere to the support surface 17 without any special treatment, when thermally fused to the support surface under conditions known to those skilled in the art of making PVC resilient floor coverings.

To enhance adhesion of the wear layer base coat 31 to the initial wear layer 29, it is preferable to treat the initial wear layer 29 with an acid wash/surfactant solution prior to application of the wear layer base coat 31.

To enhance adhesion of the wear layer top coat 33 to the wear layer base coat 31, it is preferable to chemically cross-link the two coatings to each other. This can be achieved by formulation adjustments in the coating and/or changes in the curing process. For example, the surface of the wear layer base coat 31 can be only partially cured, leaving sites available for subsequent chemical reaction with the wear layer top coat 33. The wear layer top coat 33 is then applied and fully cured, at which time, it simultaneously reacts with those sites on the surface of the wear layer base coat 31 available for chemical cross-linking, resulting in excellent adhesion at all coating interfaces.

Preferably, this can be achieved by formulating the wear layer base coat 31 to be fully cured in an inert atmosphere, such as nitrogen, but only partially cured in air. With such a coating, the atmosphere in the curing chamber can be adjusted to allow for complete cure of the bulk of the wear layer base coat 31, while leaving the surface only partially cured.

Alternatively, the wear layer base coat 31 can be formulated, such that the bulk of the coating will be fully cured in an air atmosphere, but the surface will be only partially cured, leaving sites available for subsequent cross-linking with the wear layer top coat 33. With such systems, it is not necessary to have an inert atmosphere in the wear layer base coat 31 curing chamber. If wear layer top coat 33 is not used, the wear layer base coat 31 should preferably be fully cured in, for example, an inert atmosphere, such as nitrogen.

Figure 2:
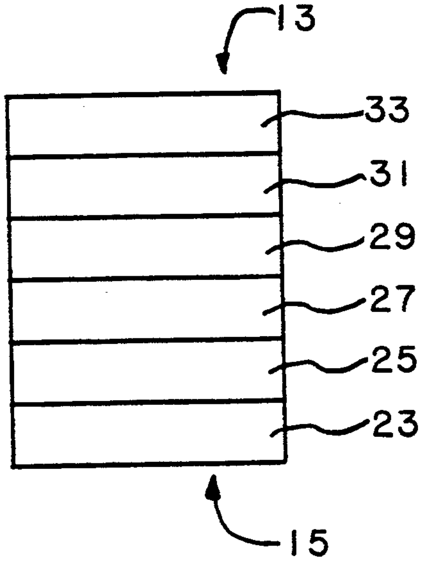

FIG. 2 illustrates an embodiment, wherein the substrate layer 21 of FIG. 1 is not utilized.

Figure 3:
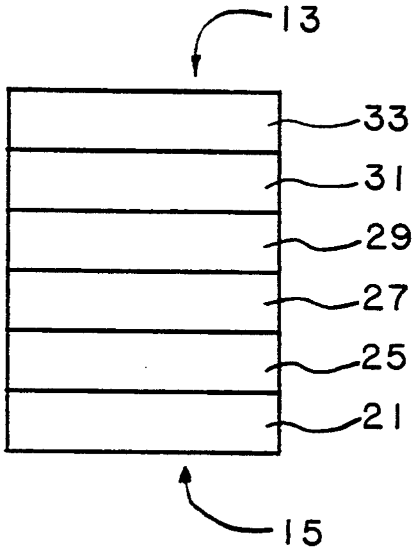

FIG. 3 shows an embodiment, wherein an improved wear surface of the present invention (layers 31 and 33) is used and a conventional substrate layer 21 is used in place of strengthening layer 23.

Figure 4:
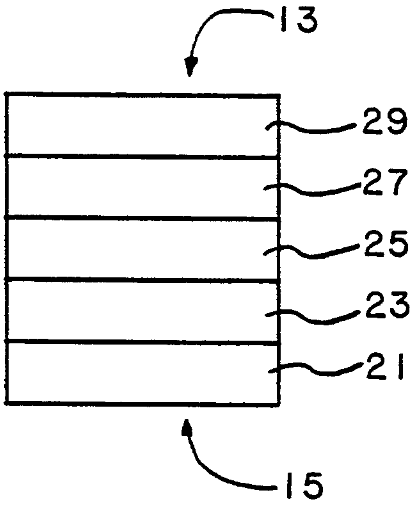

FIG. 4 exemplifies an embodiment, wherein a strengthening layer 23 of the present invention is used, and a conventional wear layer 29 is used. That is, wear layers 31 and 33 are not used.

Figure 5:
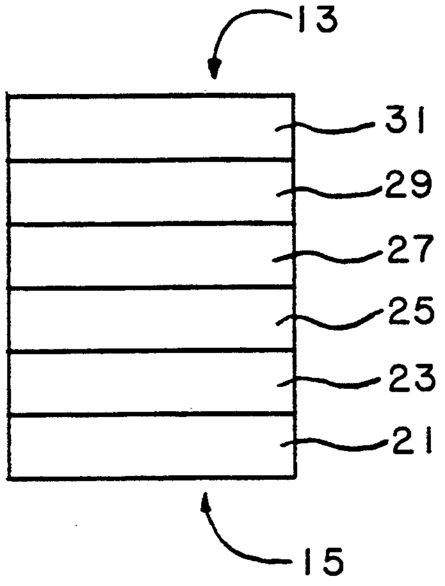

In FIG. 5, the wear layer base coat 31 is utilized with the structure of FIG. 4. In this embodiment, a cross-linked strengthening layer is used without a wear layer top coat.

Figure 6:
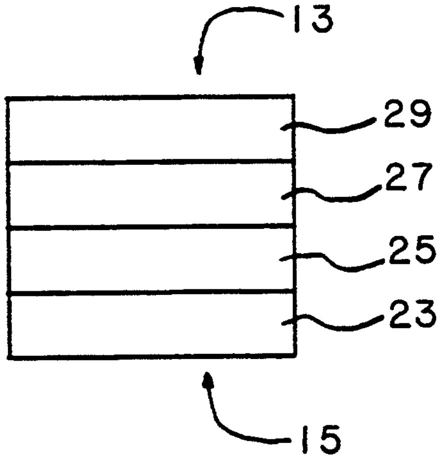

FIG. 6 illustrates an embodiment, wherein the substrate layer 21 of FIG. 4 is not utilized. Similarly, it is understood that the substrate layer 21 of FIG. 5 is optional.

Figure 7:
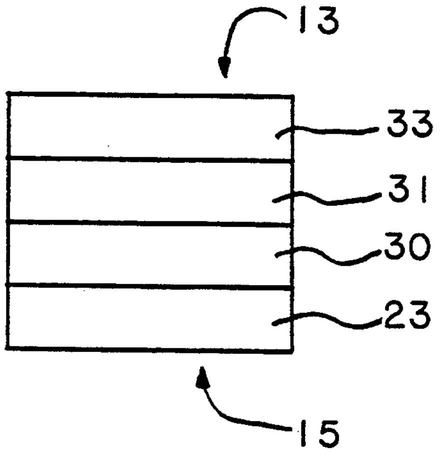

FIG. 7 shows an embodiment wherein the wear surface and strengthening layer are used without a foam layer, without an initial wear layer and without a printed design layer. In place of the foam layer, printed design layer, and the initial wear layer is a design layer 30, typically an inlaid PVC layer comprising a cured layer of poly(vinyl chloride) resins, calcium carbonate fillers, plasticizers, stabilizers and pigment colorants. Inlaid PVC design layer 30 can also be used in place of the printed design layer 27 in other embodiments while still utilizing the foam layer and initial wear layer.

Figure 8:
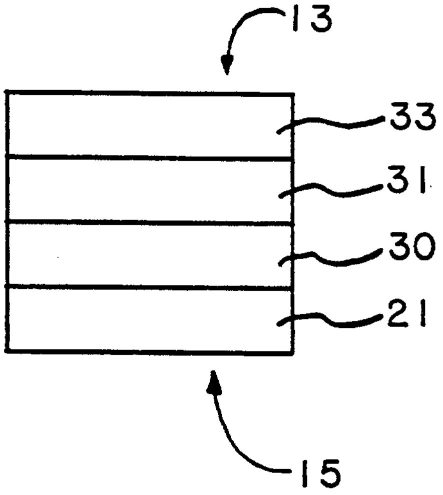

FIG. 8 exemplifies an embodiment, wherein a conventional substrate layer 21 is used in place of strengthening layer 23 of FIG. 7.

The resilient floor coverings of the instant invention can be applied to a floor in methods known to those in the art. Preferably, the floor covering of the instant invention is formulated and is applied as a perimeter fastened tension floor.

The following examples further illustrate preferred embodiments of the present invention. The examples should in no way be considered limiting, but are merely illustrative of the various features of the claimed invention.

EXAMPLE 1

The cross-linkable poly(vinyl chloride) plastisol used to form the strengthening layer was prepared according to the following formulation:

| Coating A Ingredients | Parts by weight |
|---|---|
| Dispersion Grade PVC Homopolymer | 69.1 |
| Blending Grade PVC Homopolymer | 30.9 |
| Secondary Plasticizer-Aliphatic/Aromatic Hydrocarbon Mixture | 6.8 |
| 2,2,4-Trimethyl-1,3-pentanediol diisobutyrate | 6.8 |
| Trimethylolpropane trimethacrylate | 17.5 |
| Calcium/Zinc/Phosphite stabilizer | 8.2 |
| Di-t-butyl peroxide | 0.4 |
| Butyl Benzyl Phthalate | 10.0 |
| Organic arsenical fungicide (2% active) dispersed in Butyl Benzyl Phthalate | 4.9 |
| Titanium Dioxide | 1.8 |
| Calcium Carbonate | 18.2 |

This plastisol was prepared by thoroughly mixing the above ingredients in a method known to one of ordinary skill in the art, such as using a Cowles Disperser.

The cross-linkable plastisol may be applied directly to a suitable strippable release carrier. Alternately, a strippable release carrier may be first coated with about 7 mils of a non-foamable uncross-linked coating having the following formulation:

| Coating B Ingredients | Parts by weight |
|---|---|
| Dispersion Grade PVC Homopolymer | 69.7 |
| Blending Grade PVC Homopolymer | 30.3 |
| Butyl Benzyl Phthalate | 15.4 |
| Secondary Plasticizer-Aliphatic/Aromatic Hydrocarbon Mixture | 6.6 |
| 2,2,4-Trimethyl-1,3-pentanediol diisobutyrate | 11.5 |
| Naphtha diluent | 2.3 |
| Calcium/Zinc/Phosphite stabilizer | 5.0 |
| Polyethylene Glycol (400 m. wt.) | 1.3 |
| Calcium Carbonate | 12.1 |
| Organic arsenical fungicide (2% active) dispersed in Butyl Benzyl Phthalate | 7.1 |

The coated release carrier was heated at 325° F. for 75 seconds to gel the 7 mil uncross-linked PVC plastisol coating B. This gelled coating B was then coated with a thickness of about 37 mils of coating A. After application the wet plastisol was gelled by heating at 325° F. for 90 seconds.

The strengthening layer is now ready to receive additional coatings to prepare a useful resilient floor covering.

EXAMPLE 2

The gelled construction described in Example 1, comprising 7 mils of a substrate coat B and 37 mils of strengthening coat A, was coated with about 10 mils of a foamable PVC plastisol having the following formulation:

| Coating C Ingredients | Parts by weight |
|---|---|
| Dispersion Grade PVC Homopolymer (Foam Type) | 70.0 |
| Blending Grade PVC Homopolymer | 30.0 |
| Di(C7-9-11-alkyl) Phthalate | 28.2 |
| Butyl Benzyl Phthalate | 9.0 |
| Aliphatic/Aromatic Hydrocarbon Mixture | 9.5 |
| 2,2,4-Trimethyl-1,3-pentanediol diisobutyrate | 10.5 |
| Dispersing Aid - modified polyester dissolved in naphtha | 0.3 |
| Azodicarbonamide | 1.1 |
| Organic arsenical fungicide (2% active) in butyl benzyl phthalate | 5.4 |
| Zinc Oxide | 0.3 |
| Titanium Dioxide | 12.0 |
| Calcium Carbonate | 15.0 |

This foamable plastisol was gelled by heating at 325° F. for 60 seconds. The surface of the gelled foamable plastisol was then printed with a decorative pattern by gravure printing.

One or more of the inks used may contain a retarder in order to develop a textured relief structure in register with the decorative pattern. The inks used are those customarily used to print decorative patterns on resilient floor coverings. Representative ink formulas may be found in U.S. Pat. No. 3,293,094 and in other references known to those of ordinary skill in the art.

The printed sheet was then coated with about 19–20 mils of an initial wear layer of a clear PVC plastisol having the following formulation:

| Coating D Ingredients | Parts by weight |
|---|---|
| Dispersion Grade PVC Homopolymer (High Clarity Type) | 100.0 |
| Butyl Benzyl Phthalate | 35.3 |
| Aliphatic/Aromatic Hydrocarbon Mixture | 6.1 |
| 2,2,4-Trimethyl-1,3-pentanediol diisobutyrate | 3.4 |
| Naphtha diluent | 5.6 |
| Calcium/Zinc/Phosphite Complex Stabilizer | 7.6 |
| Polyethylene Glycol (400 m. wt.) | 1.4 |

This coated sheet was then heated at 380° F. for 250 seconds to completely fuse the initial wear layer and the other previously gelled PVC layers, blow the foamable plastisol into the foam layer, and form the decorative relief texture if one or more retarders were used in the gravure ink layer. This resulting structure will be referred to in subsequent examples as the underlying structure I.

The product of this example may be used at this point as a strengthened resilient floor covering having a clear PVC plastisol wear layer. However, preferably the initial wear layer of a PVC surface is washed with aqueous formic acid (1% of technical grade acid) containing 0.4% of a nonionic surfactant to clean it and assure adhesion of PVC surface to the wear layer base coat. The washed and dried PVC surface is then coated with the two-stage wear layer base and top coats as described in, for instance, Example 5, to furnish a resilient floor covering having both an improved strengthening layer and a flexible wear surface having improved stain, mar, scuff and soil resistance.

EXAMPLE 3

The following comparison was made to demonstrate the superior properties of a strengthening layer of the instant invention.

A floor covering was prepared as described above in Example 2. In sample E, the formulation used for the strengthening layer is that utilized in Example 1 above. Sample F was prepared in the same manner as Sample E except that the strengthening layer in Sample F is a typical non-foamable PVC plastisol that does not have a polymerized, cross-linked monomer. Samples E and F utilized the same thicknesses for corresponding layers.

The results are shown below in Table 1.

TABLE 1

| Test | Sample E | Sample F |
|---|---|---|
| Tensile, PSI | 1909 ± 44 | 1381 ± 266 |
| Elongation, % | 127 ± 10 | 163 ± 42 |
| Tear, pound | 37.9 ± 1 | 31.4 ± 1 |
| <u>Stiffness, Taber unit</u> | | |
| machine direction | 717 ± 42 | 513 ± 50 |
| cross machine-direction | 703 ± 103 | 530 ± 74 |
| Pneumatic Indent Residual, (3000 psi), mils | 1.8 ± 0.75 | 2.6 ± 0.49 |
| Sliding Gouge, (fail), PSI | 212 | 50 |

As can be seen from Table 1 above, a surface covering having a strengthening layer of the instant invention exhibits improved properties over a surface covering having a conventional strengthening layer. Specifically, it exhibits improved strength, toughness, resistance to breakage, especially resistance to tearing, and resistance to deformation, especially resistance to indentation and sliding gouging.

EXAMPLE 4

Selected physical properties of the preferred wear layer base coats and wear layer top coats are listed below in Tables 2 and 3.

In Table 2, wear layer formulations were applied to a glass substrate and drawn down over the substrate with either a Myer rod or a glass rod with tape on each end to provide the appropriate film thickness. After application to the glass substrate, the coatings were cured, either thermally in a forced draft oven, or with ultraviolet light. The specimens were removed from the glass substrate resulting in free films. The thermal properties of the free films were evaluated on a differential scanning calorimeter (DSC). The mechanical properties were measured on an Instron at room temperature (about 70° F.).

TABLE 2

| Wear Layer Coating | Tg(°C.) | % Elongation | Tensile Strength (PSI) |
|---|---|---|---|
| Base Coat | | | |
| PHOTOGLAZE ® U248 | −2 | 7 | 360 |
| PHOTOGLAZE ® U233 | 9 | 17 | 1,100 |
| PHOTOGLAZE ® U206 | 32 | 15 | 1,400 |
| VALRAD ® KKC0047 | 50 | 13 | 2,200 |
| Solution G | 93 | 4 | 11,000 |
| Top Coat | | | |
| PHOTOGLAZE ® U249 | 67 | 3 | 5,320 |
| VALRAD ® KKC0044 | 107 | 2 | 3,570 |

Solution G used in Table 2 above and Table 3 below has the following composition.

| Solution G - Thermoset Vinyl Solution | |
|---|---|
| Component | Weight Percent |
| xylene | 31.18 |
| methylisobutyl ketone | 31.18 |
| diacetone alcohol | 15.34 |
| UCAR ® solution vinyl resin VAGF | 18.09 |
| RESIMENE ® 717 | 3.79 |
| CYCAT ® 296-9 Catalyst | 0.42 |
| Total | 100.00 |

UCAR ® solution vinyl resin VAGF (CAS No. 50660-45-2): a vinyl chloride-vinyl acetate hydroxyl modified copolymer, specifically, 2-propenoic acid, 3-hydroxypropyl ester, polymer with chloroethene and ethenyl acetate, sold by the Union Carbide Corp. of Danbury, CT, U.S.A.
RESIMENE ® 717 (CAS No. 68002-20-0): a methylated melamine-formaldehyde resin solution sold by the Monsanto Co. of St. Louis, MO, U.S.A.
CYCAT 296-9 catalyst: a solution of a phosphoric acid derivative in isobutanol.

In Table 3, wear layer base coat or wear layer top coat formulations were applied to the underlying structure I, as specified in Example 2. This underlying structure I was flexible and had a nominal thickness of about 80 mils. The formulations were applied to the initial wear layer of PVC at a dry film thickness of about 1 mil.

Mandrel bend flexibility tests were then performed, wherein the bends were made face out, that is, with the top surface (wear layer base coat or wear layer top coat) facing out and away from the mandrel and the back or bottom of the product (uncross-linked substrate) in contact with the mandrel. The specimen is stapled tightly around the mandrel. If the wear surface does not visibly exhibit cracks after being secured around the mandrel for five minutes, it passes the test. If cracks are visibly apparent to the naked eye, it fails the test. The mandrel bend flexibility tests were performed at various mandrel diameters.

For purposes of determining the face out mandrel bend test for the wear layer base coat or wear layer top coat, the underlying surface, which is adhered to the wear layer base coat or wear layer top coat, must be flexible enough to pass the 0.25 inch mandrel diameter face out mandrel bend test when tested without the wear layer base coat and wear layer top coat.

TABLE 3

| | Mandrel Bend Flexibility Test Diameter of Mandrel (inches) | | |
|---|---|---|---|
| Wear Layer Coating | 1.0 | 0.5 | 0.25 |
| Base Coat | | | |
| PHOTOGLAZE ® U248 | Pass | Fail | Fail |
| PHOTOGLAZE ® U233 | Pass | Fail | Fail |
| PHOTOGLAZE ® U206 | Pass | Pass | Fail |
| VALRAD ® KKC0047 | Pass | Pass | Pass |
| Solution G | Pass | Pass | Pass |
| Top Coat | | | |
| PHOTOGLAZE ® U249 | Fail | Fail | Fail |
| VALRAD ® KKC0044 | Fail | Fail | Fail |

EXAMPLE 5

A sample of typical cushion vinyl resilient floor covering, produced by means well-known to those of ordinary skill in the art (see, for example, U.S. Pat. No. 4,409,280 to Wiley et al.) and comprising a conventional substrate layer, a foam layer, a gravure printed decorative pattern and an initial wear layer of a clear plasticized poly(vinyl chloride) with a three-dimensional relief texture, was cleaned by washing with an aqueous solution of 1% formic acid (90% strength as received) and 0.4% of a nonionic surfactant. This washed sample of a typical cushion vinyl resilient floor covering will be referred to in subsequent examples as the underlying structure II.

Underlying structure II was dried and then coated with PHOTOGLAZE ® U248 sold by the Lord Corp. The wet coating was distributed over the sample by draw-down with a #30 wire-wound rod. The sample was then passed under an air knife operating at about 4 p.s.i.g. to remove excess coating and distribute the remainder uniformly over the sample surface as a 1.0–1.2 mil wet film. This film was cured by passing the sample at 40 ft/min under two medium pressure mercury arc lamps operating at 200 watt/inch in an air atmosphere. The sample was then re-coated with PHOTOGLAZE ® U249 sold by the Lord Corp. via the same procedure except that a #5 wire-wound rod was used, and the uniformly distributed wet film after air doctoring was 0.1–0.3 mil thick. This film was cured by passing the sample at 40 ft/min under two medium pressure mercury arc lamps operating at 200 watt/inch in a nitrogen atmosphere (i.e., less than 2,000 ppm oxygen)

The result was a resilient floor covering having high gloss and 100% resistance to scuffing by a thermoplastic elastomer shoe sole. The gloss loss in a falling sand test using 2 kg of sand was only 23%–27%, and the resistance to staining by mustard, brown paste shoe polish, and coal tar based driveway sealer was excellent.

EXAMPLE 6

Underlying structure II described in Example 5 was coated with VALRAD ® KKC0047 sold by The Valspar Corp. as the wear layer base coat, following the procedure described in Example 5. This coating was cured in an atmosphere of 1%–2% oxygen in nitrogen. VALRAD® KKC0044 sold by The Valspar Corp. was used as the wear layer top coat, and was applied and cured as described in Example 5.

The result was a resilient floor covering having high gloss and excellent gloss retention, stain resistance, and scuff resistance.

EXAMPLE 7

Underlying structure II described in Example 5 was coated with PHOTOGLAZE® U233 sold by the Lord Corp. as the wear layer base coat, following the procedure described in Example 5. This coating was cured in an atmosphere of 5%–7% oxygen in nitrogen. PHOTOGLAZE® U249 sold by the Lord Corp. was used as the wear layer top coat exactly as described in Example 5. The resulting resilient floor covering had the same properties as described in example 5.

EXAMPLES 8–15

These data are presented to illustrate the superior performance of a wear surface of the instant invention.

In Examples 8–15, the wear layers were coated on top of underlying structure I, as described in Example 2.

The following rating scales were used in Examples 8–15.

Crosshatch Adhesion (0% to 100% Scale):
100%=No Delamination
0%=Total Delamination Pendulum Scuff Test:
Excellent
Good
Fair
Poor Stain Test (1 to 5 Rating Scale):
1=No Stain
5=Severe Stain In Example 8, an initial wear layer of PVC was applied. Poor scuff, stain and mar resistance resulted.

In Example 9, an embodiment of the current invention is exemplified. An initial wear layer of PVC was coated with a wear layer base coat. As compared to Example 8, improved scuff and mar resistance was achieved.

In Example 10, an initial wear layer of PVC was coated directly with a wear layer top coat instead of applying the wear layer top coat over a wear layer base coat. No wear layer base coat was used. This Example exhibited poor scuff resistance due to delamination.

In Example 11, an embodiment of the current invention was utilized. An initial wear layer of PVC was coated with a wear layer base coat and then subsequently coated with a wear layer top coat. Excellent scuff, stain and mar resistance were exhibited.

The results for Examples 8–11 are shown below in Table 4.

TABLE 4

| | Example Number | | | |
|---|---|---|---|---|
| | 8 | 9 | 10 | 11 |
| Base Coat Composition | None | PHOTOGLAZE ® U233 | None | PHOTOGLAZE ® U233 |
| Base Coat DFT (mils) | — | 1.2 | — | 0.9 |
| Top Coat Composition | None | None | PHOTOGLAZE ® U249 | PHOTOGLAZE ® U249 |
| Top Coat (DFT) (mils) | — | — | 0.3 | 0.3 |
| Crosshatch Adhesion | — | 100% | 100% | 100% |
| Pendulum Scuff Test | Poor | Excellent | Poor (Delamination) | Excellent |
| Stain Test | | | | |
| French's Mustard | 1–2 | 3 | 1 | 1 |
| Oil Brown Dye Solution | 3 | 2–3 | 1 | 1 |
| Kiwi Brown Shoe Polish | 4–5 | 5 | 2 | 1–2 |
| Tincture of Iodine | 2 | 5 | 3–4 | 3–4 |
| Koppers KC-261 | 4 | 2 | 1 | 1 |
| Sharpie Blue Marker | 3–4 | 3 | 1 | 1 |
| Sand Test | | | | |
| Initial Gloss | 87 | 94 | 92 | 91 |
| Final Gloss | 30 | 90 | 69 | 70 |
| % Gloss Loss | 66% | 4% | 25% | 24% |
| 95% C.I. (+/−) | 4% | 1% | 1% | 2% |
| Number of Specimens | 6 | 6 | 6 | 6 |

Example 12 illustrates that a wear layer base coat of a thermoset solvent based urethane solution coated over an initial wear layer of PVC and thermally cured can provide excellent scuff resistance, but is lacking in its stain resistant properties. In fact, this specific formulation was actually tacky to the touch.

In Example 13, the wear layer base coat of the article of Example 12 was coated with a wear layer top coat of PHOTOGLAZE® U249 to produce a wear surface of the instant invention. Compared to Example 11, the composite of Example 13 also exhibited excellent scuff and stain resistance. But, the wear surface of Example 13 exhibited cracks.

Example 14 shows that a wear layer base coat of a thermoset solvent based vinyl solution coated over an initial PVC wear layer and thermally cured can provide excellent scuff and stain resistance, but is lacking in its mar resistant properties.

Example 15 illustrates that when the wear layer base coat of the article of Example 14 is coated with a wear layer top coat of PHOTOGLAZE® U249 to form a wear surface of the instant invention, the excellent scuff and stain resistance are maintained and the mar resistance is improved.

The results for Examples 12–15 are shown below in Table 5. The composition of Solution G in Table 5 can be found in Table 2 above. Solution H in Table 5 has the following composition:

| Solution H - Thermoset Urethane Solution | |
|---|---|
| Component | Weight Percent |
| DESMOPHEN 670A-80 | 39.00 |
| 2-ethoxyethyl acetate | 31.35 |
| xylene | 6.81 |
| methylethyl ketone | 7.27 |

-continued

| Solution H - Thermoset Urethane Solution | |
|---|---|
| Component | Weight Percent |
| DABCO ® T-12 catalyst | 0.04 |
| DESMODUR ® N-3200 | 15.53 |
| Total | 100.00 |

DESMOPHEN 670A-80: a polyester polyol sold by the Mobay Corp. of Pittsburg, PA, U.S.A.
DABCO ® T-12 catalyst: dibutyltin dilaurate catalyst sold by Air Products and Chemicals, Inc. of Allentown, PA, U.S.A.
DESMODUR ® N-3200: a 1,6-hexamethylene diisocyante based polyisocyanate sold by the Mobay Corp. of Pittsburg, PA, U.S.A.

TABLE 5

| | Example Number | | | |
|---|---|---|---|---|
| | 12 | 13 | 14 | 15 |
| Base Coat Composition | Solution H | Solution H | Solution G | Solution G |
| Base Coat DFT (mils) | 1.5 | 1.6 | 0.8 | 0.9 |
| Tol) Coat Composition | None | PHOTOGIAZE ® U249 | None | PHOTOGLAZE ® U249 |
| Top Coat (DFT) (mils) | — | 0.3 | — | 0.3 |
| Crosshatch Adhesion: | 100% | 100% | 100% | 0% |
| Pendulum Scuff Test; | Excellent | Excellent | Excellent | Excellent |
| Stain Test: | | | | |
| French's Mustard | 4 | 1 | 1 | 1 |
| Oil Brown Dye Solution | 5 | 1 | 1 | 1 |
| Kiwi Brown Shoe Polish | 5 | 1-2 | 1 | 1 |
| Tincture of Iodine | 5 | 3 | 1 | 3-4 |
| Koppers KC-261 | 5 | 1 | 1 | 1 |
| Sharpie Blue Marker | 5 | 1 | 2 | 1 |
| Sand Test: | | | | |
| Initial Gloss | — | —[1] | 99 | 93 |
| Final Gloss | — | —[1] | 28 | 64 |
| % Gloss Loss | — | —[1] | 72% | 32% |
| 95% C.I. (+/−) | — | — | 4% | 1% |
| Number of Specimens | — | — | 6 | 6 |

[1]Not measured - cracks exhibited.

Although the present invention has been described in connection with preferred embodiments, it is understood that those skilled in the art are capable of making modifications and variations without departing from the scope or spirit of the present invention. Therefore, the foregoing description of preferred embodiments is not to be taken in a limiting sense, and the present invention is best defined by the following claims and their equivalents.

We claim:

1. A resilient surface covering, said resilient surface covering comprising:

(a) a resilient support surface comprising an unfoamed strengthening layer comprising a vinyl resin and a polymerized, cross-linked monomer, with the proviso that, said strengthening layer is not disposed between two foam layers; and (b) a resilient wear surface adhered to said resilient support surface.

2. A resilient surface covering as claimed in claim 1, wherein said vinyl resin is a homopolymer of poly(vinyl chloride) or a copolymer of poly(vinyl chloride).

3. A resilient surface covering as claimed in claim 2, wherein said vinyl resin is a homopolymer of poly(vinyl chloride).

4. A resilient surface covering as claimed in claim 1, wherein said polymerized, cross-linked monomer is a mono-, di-, tri- or tetrafunctional acrylate or methacrylate or blend thereof.

5. A resilient surface covering as claimed in claim 4, wherein said polymerized, cross-linked monomer is trimethylolpropane trimethacrylate.

6. A resilient surface covering as claimed in claim 1, wherein said vinyl resin is a homopolymer of poly(vinyl chloride) or a copolymer of poly(vinyl chloride) and said polymerized, cross-linked monomer is a trifunctional or tetrafunctional acrylate or methacrylate.

7. A resilient surface covering as claimed in claim 6, wherein said vinyl resin is a homopolymer of poly(vinyl chloride) and said polymerized, cross-linked monomer is trimethylolpropane trimethacrylate.

8. A resilient surface covering as claimed in claim 1, wherein the strengthening layer is the outermost bottom layer.

9. A resilient surface covering as claimed in claim 1, wherein, overlying and adhered to said strengthening layer is a foam layer.

10. A resilient surface covering as claimed in claim 9, wherein the surface of said foam layer on the surface facing said wear surface is printed with a design layer.

11. A resilient surface covering as claimed in claim 9, wherein said wear surface is overlying and adhered to said foam layer and comprises a layer of poly(vinyl chloride).

12. A resilient surface covering as claimed in claim 11, wherein overlying and adhered to said layer of poly(vinyl chloride) is a wear layer base coat, said wear layer base coat comprising a flexible, thermoset, polymeric composition having a flexibility, such that the wear layer base coat passes a 1 inch mandrel diameter face out mandrel bend test when applied at a nominal dry film thickness of 1.0 mil over a flexible 80 mil underlying substrate.

13. A resilient surface covering as claimed in claim 12, wherein underlying and adhered to said strengthening layer is a substrate layer comprising an uncrosslinked vinyl composition or a fibrous sheet.

14. A resilient surface covering, said resilient surface covering comprising:

(a) a resilient support surface comprising an unfoamed strengthening layer comprising a vinyl resin and a polymerized, cross-linked monomer, with the proviso that, said strengthening layer is not disposed between two foam layers; and (b) a resilient wear surface adhered to said resilient support surface, said resilient wear surface comprising an underlying wear layer base coat and an overlying wear layer top coat adhered to said wear layer base coat, said wear layer base coat comprising a flexible, thermoset, polymeric composition having a flexibility, such that the wear layer base coat passes a 1 inch mandrel diameter face out mandrel bend test when applied at a nominal dry film thickness of 1.0 mil over a flexible 80 mil underlying substrate, said wear layer top coat comprising a hard, thermoset, polymeric Uv-curable blend of acrylic or acrylate monomers, said wear layer top coat having a glass transition temperature of greater than 50° C.

15. A resilient surface covering as claimed in claim 14, wherein the strengthening layer is the outermost bottom layer.

16. A resilient surface covering as claimed in claim 14, wherein the wear layer base coat and wear layer top coat are cross-linked to each other.

17. A resilient surface covering as claimed in claim 14, wherein, overlying and adhered to said strengthening layer is a foam layer.

18. A resilient surface covering as claimed in claim 17, wherein the surface of said foam layer on the surface facing said wear surface is printed with a design layer.

19. A resilient surface covering as claimed in claim 17, wherein overlying and adhered to said foam layer and underlying and adhered to said wear layer base coat is an initial wear layer of poly(vinyl chloride).

20. A resilient surface covering as claimed in claim 19, wherein underlying and adhered to said strengthening layer is a substrate layer comprising an uncross-linked vinyl composition or a fibrous sheet.

21. A resilient surface covering as claimed in claim 17, wherein adhered to the surface of said foam layer on the surface facing said wear surface is a design layer comprising a nonfoamed, inlaid poly(vinyl chloride) layer.

22. A resilient surface covering as claimed in claim 21, wherein overlying and adhered to said non-foamed, inlaid poly(vinyl chloride) layer and underlying and adhered to said wear layer base coat is an initial wear layer of poly(vinyl chloride).

* * * * *